Patented Jan. 23, 1940

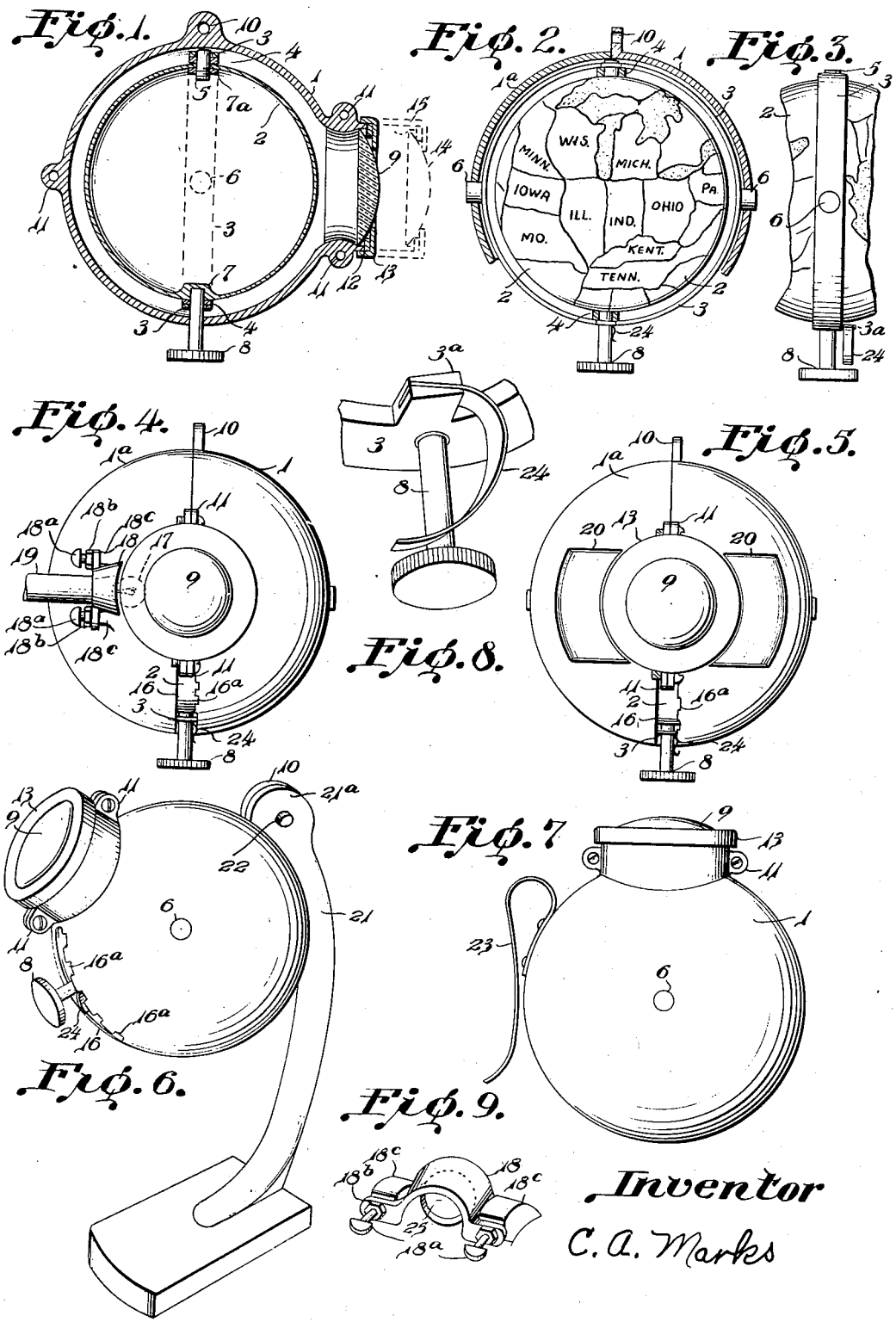

2,187,947

UNITED STATES PATENT OFFICE 2,187,947

MICROSCOPIC REVOLVING MAP

Charles A. Marks, Elkhart, Ind.

Application January 16, 1939, Serial No. 251,150

7 Claims. (Cl. 35—46)

It is an object of my invention to provide a globe on which a map is mounted which may be drawn on a microscopic or very small scale, and to provide means for mounting the globe so that the globe may be readily turned into different positions to bring different portions of the map into the field of view.

It is a further object of my invention to provide means for magnifying the portion of the map brought into the field of view, so that a relatively small globe may be used to carry a map that shows great detail or a very large territory and thus adapting the globe for use in many places, as on the instrument board of an automobile, on the belt of a policeman or on the desk in home, school and office.

The globe may be used to carry any kind of a map as road, city, county, State and United States or any portion thereof and also maps of buildings and construction plans of any kind.

With these and other objects and advantages in view reference is made to the following description and accompanying drawing in which:

Figure 1 is a longitudinal section. Fig. 2 is a cross section of casing and elevation of globe. Fig. 3 is an elevation of a ring or swivel collar and a portion of globe mounted therein. Fig. 4 is a front elevation of model having electric bulb for lighting globe. Fig. 5 is an elevation of model having windows for lighting globe. Fig. 6 is a perspective of model and a supporting standard therefor. Fig. 7 is a side elevation of model with spring clip for supporting same. Figs. 8 and 9 are perspective views of details.

In the drawing in which like numerals refer to the same part numeral 1 designates one half of casing connected to the other half 1a of casing by means of lug and screw connections 11. Mounted within the casing is a globe 2, on which any kind of a map may be shown; in Figure 2 a portion of the United States is shown. Surrounding the globe is a swivel collar or a ring 3 which pivotally supports the globe by means of a stud shaft 5 and a button shaft 8. The stud shaft 5 has a screw threaded connection with a member 7a secured by shellac or in any other suitable way to the inside of globe 2, and the stud shaft 5 pivots in an opening in ring 3. The button shaft 8 pivots in an opening in ring 3 and has a screw threaded connection to a member 7 secured by shellac or other means to the inside of the globe 2. Washers 4 space the globe 2 from ring 3.

On opposite sides of ring 3 are trunnions or bearing studs 6, one stud 6 having a bearing in half 1 of casing and the other stud 6 having a bearing in the other half 1a of casing. By loosening the screws in the connections 11, the two halves 1 and 1a of the casing may be separated and the globe and ring 3 removed from the casing. To remove the globe 2 from ring 3, the globe 2 is held from rotation and the button shaft 8 turned to the left which disconnects the shaft 8 from connection 7.

Frictionally retained between the two halves of the casing is a magnifying lens 9. To assist in holding the lens 9 in proper position a washer 12 and retaining collar 13 may be provided. The collar 13 frictionally engages the outside of the projecting portions on the casing. Where additional magnifying means is desired another magnifying lens 14 may be added as shown in dotted outline in Figure 1. The lens 14 is frictionally retained within the retaining collar 15 which is adapted to frictionally engage over the projecting portion of the casing after the collar 13 is removed.

Between the two halves of the casing is a slot 16 through which the button shaft 8 projects as shown in Figures 4, 5 and 6. In this slot, the shaft 8 may be turned about its own axis and shifted bodily in the arc of a circle about the axis of trunnions 6. Along one side of the slot 16 are notches 16a to be releasably engaged by spring 24 rigidly secured at one end to a lug 3a on ring 3 as shown in Figure 8. By releasing spring 24 from a notch 16a the button shaft 8 may be shifted in the slot 16 to turn the globe 2 about the axis of trunnions 6.

To illuminate the map an electric light bulb 17 having electrical connection 19 is located in the casing at one side and back of the lens 9. The bulb 17 is held in position in an opening 25 of the casing by a cover plate 18 which also acts as a reflector. The cover plate 18 is removably connected to the casing by thumb screws 18a having screw threaded connections with abutments 18c on the casing, as shown in Figure 9. Lock nuts 18 hold the thumb screws 18a in position.

The model may be supported in various ways. To support the model on a desk, a standard 21 may be used as shown in Figure 6. The standard 21 is provided with spaced lugs 21a between which a lug 10 on the casing is pivoted by means of pin 22.

In the modification shown in Figure 7, a spring clip 23 is riveted to the casing and is adapted to engage over any convenient member as for instance the belt of a policeman.

To operate the model so as to shift any portion of the map on globe 2 into position to be viewed through lens 9 it is merely necessary to turn the button on shaft 8 which turns the globe 2 about the axis of button shaft 8 and stud shaft 5, and on release of spring 24 from a notch 16a the shaft 8 may be moved bodily in slot 16 to shift the globe 2 about the axis of trunnions 6.

It is apparent that various changes may be made in the details of the construction shown and described without departing from the spirit of the invention or the scope of the appended claims.

I claim:

1. In a device of the class described, a globe for supporting a microscopic map, a casing within which the globe is mounted, a ring surrounding said globe, said ring having trunnions on opposite sides, said casing having bearings on opposite sides in which said trunnions are pivotally mounted, said globe having a pivotal connection with said ring, the axis of said pivotal connection being at right angles to the axis of said trunnions, means on said pivotal connection and extending outside said casing for turning said globe about both said axes, said casing having an opening for viewing said globe, magnifying means in said opening, and means adjacent said opening for illuminating said globe.

2. In combination, a globe for supporting a map, means for pivotally supporting said globe to rotate about one axis, a second means supporting said first mentioned means to permit said globe to be rotated about a second axis at an angle to the first mentioned axis, so that said globe may be turned into various positions to be readily viewed.

3. In combination, a support, a globe for carrying a miscroscopic map, means for pivotally mounting said globe on said support, magnifying means adjacent said globe for viewing said map, said magnifying means being mounted on said support.

4. In combination, a globe for supporting a map, a casing, means for pivotally mounting said globe in said casing, an opening in said casing for viewing said map, means for illuminating said map adjacent said opening.

5. In combination, a globe for supporting a map, a casing, means for pivotally mounting said globe in said casing, means projecting exterior to said casing for rotating said globe, said casing having an opening for viewing the map on said globe.

6. In combination, a globe for supporting a map, a casing, means for pivotally supporting said globe in said casing, means projecting exterior to said casing for rotating said globe, said casing having an opening for viewing said map and means on the exterior of said casing for carrying said casing.

7. In combination, a casing, a globe for carrying a map, a ring surrounding said globe, a pivotal connection between said globe and said ring, a second pivotal connection between said ring and said casing, the axes of said pivotal connections being at right angles to each other, said casing having a slot with recesses along one edge, means including a shaft for turning said globe about both said axes, said shaft extending through said slot, a spring secured to said ring for releasably engaging one of said recesses to hold the globe from rotation about the axis of the second mentioned pivotal connection, said casing having an opening for viewing a map on said globe, and magnifying means in said opening.

CHARLES A. MARKS.